July 24, 1934.  E. W. DAVIS  1,967,707
LUBRICANT MEASURING DEVICE
Filed April 6, 1931
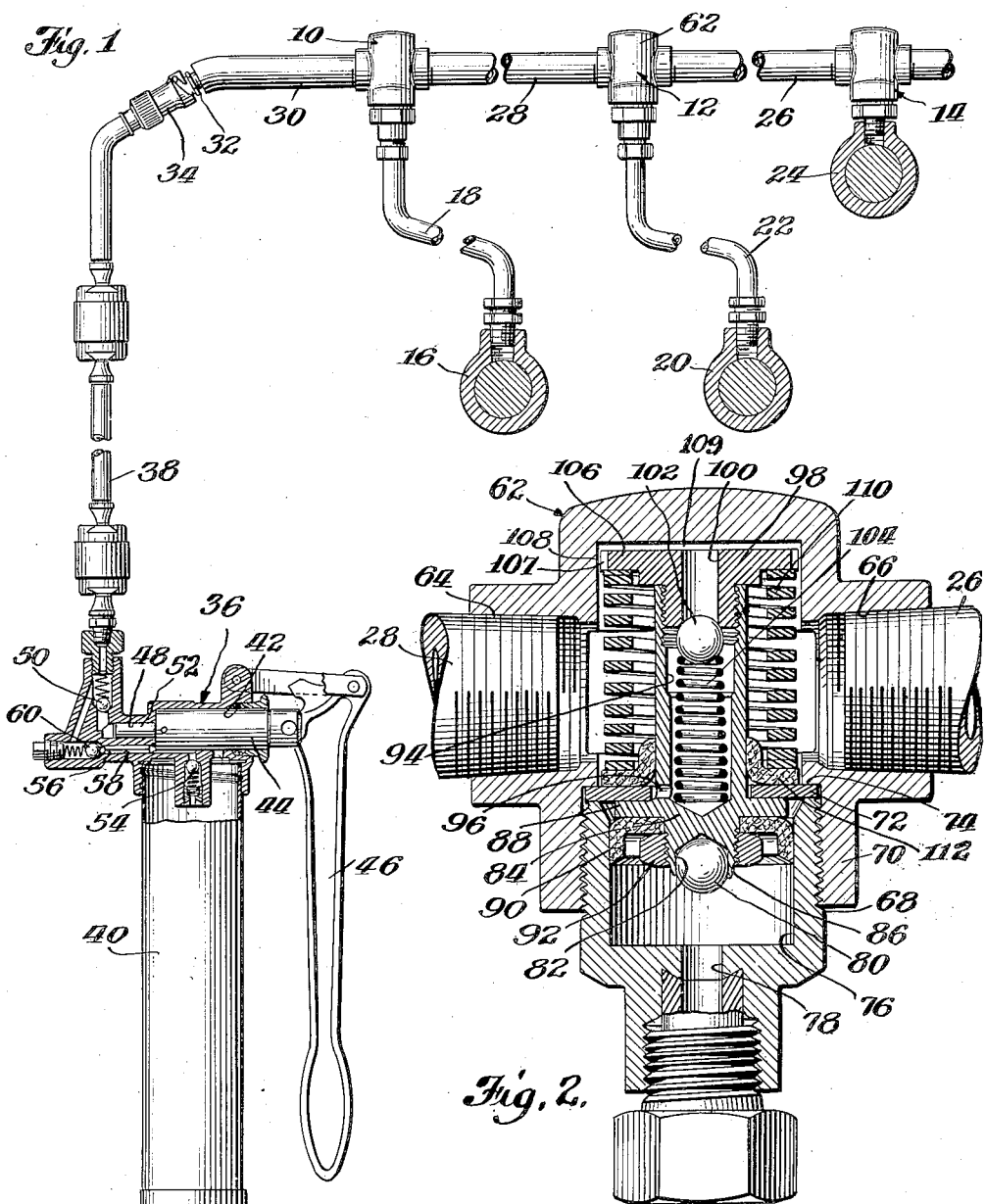
Inventor
Ernest W. Davis
By Williams, Bradbury, McCaleb & Hinkle
Attys.

Patented July 24, 1934

1,967,707

UNITED STATES PATENT OFFICE 1,967,707

LUBRICANT MEASURING DEVICE

Ernest W. Davis, Oak Park, Ill., assignor to Alemite Corporation, Chicago, Ill., a corporation of Delaware Application April 6, 1931, Serial No. 527,946

17 Claims. (Cl. 184—7)

My invention relates generally to lubricating apparatus, and more particularly to measuring valves for use in centralized lubricating systems.

It is an object of my invention to provide an improved measuring valve which is operable when supplied with lubricant under pressure to discharge a measured quantity of lubricant to a bearing requiring lubrication.

A further object is to provide an improved fluid measuring valve which will be operable to measure and discharge under pressure a quantity of fluid measured with extreme accuracy.

A further object is to provide an improved measuring valve which will operate with either oil or grease.

A further object is to provide an improved measuring valve in which the possibility of by-pass of lubricant is reduced to a minimum and in which the operation of the valve is not dependent upon the amount of oil or grease which by-passes the valve.

A further object of my invention is to provide a measuring valve which can be used in a grease lubricating system in which a large number of measuring valves are incorporated and in which the rapidity of the application of lubricant pressure to the valve will not affect its measuring operation.

A further object is to provide an improved measuring valve which is simple in construction, may be economically manufactured, and which will be positive in operation.

Other objects will appear from the following description, reference being had to the accompanying drawing, in which Figure 1 is an elevation of a lubricating system incorporating my improved measuring valves, the bearings with which the valves are associated and a portion of the lubricant pump being shown in section; and Figure 2 is an enlarged central vertical sectional view of the improved measuring valve.

In centralized lubricating systems especially for the lubrication of industrial machines, it is frequently desirable and sometimes necessary to force the lubricant into the bearings under high pressure. It is always desirable accurately to predetermine the quantity of lubricant which is supplied to each bearing or part to be lubricated, not only to avoid wastage of lubricant but because over-lubrication causes the lubricant to ooze from the bearing and drip upon the floor, or, as for instance in textile and food machinery, to drip upon the product being manufactured.

A large number of centralized lubricating systems have been proposed but these have for the most part been found to be ineffective and impractical for various reasons. One of the principal reasons these various systems proposed did not operate satisfactorily, especially when grease was used as a lubricant, was that, due to the resistance to the flow of lubricant through the conduits connecting the measuring valves, the valves farthest away from the point of application of lubricant pressure would, if they operated at all, operate so slowly that a large amount of lubricant would be by-passed. This is due to the fact that the measuring valves were so constructed as to operate satisfactorily only when lubricant pressure was applied rapidly.

With the measuring valve of my invention, I have overcome the difficulties present in most of the prior art devices by so constructing the valve that a high pressure is required to operate it and cause ejection of a measured charge of lubricant to the bearing, and under usual conditions of operation a certain pressure of a much higher order is necessary to cause replenishment of the measuring valves.

The system of my invention may be employed with a practically unlimited number of measuring devices connected in parallel. In Fig. 1, I have shown only three measuring valves 10, 12 and 14, as illustrative of a large number of valves which may be supplied with lubricant under pressure from a common source. The discharge of the valve 10 is shown as connected to a bearing 16 by a conduit 18. The discharge of the measuring valve or device 12 is similarly connected to a bearing 20 by a conduit 22. The measuring device 14 is shown as connected directly to a bearing 24.

The measuring devices 10, 12 and 14 are interconnected by conduits 26 and 28, and lubricant is supplied to the measuring device 10 through a conduit 30. A lubricant receiving fitting 32 is secured in the end of the conduit 30 and is provided with means for making a quick detachable connection with a coupler 34. The fitting 32 may be of any conventional construction except that it is not provided with the ordinary check valve so that flow back to the source may occur. If desired, of course, the conduit 30 may be directly connected to a suitable lubricant pump, the only requirement being that the pump be capable of developing a high pressure and also have means for permitting return flow from the conduit 30 to the lubricant reservoir.

For the purposes of the present disclosure, I have illustrated a hand-operated grease gun 36 as the means for supplying lubricant under pressure to the system. This grease gun is connected by a suitable flexible conduit 38 with the coupler 34 and has a lubricant receptacle 40. A suitable means, such as a spring-pressed follower piston, is provided in the receptacle 40 to force lubricant into the low pressure cylinder 42. Upon manual reciprocation of the low pressure plunger 44 by means of the handle 46, lubricant is forced into the high pressure cylinder 48, from which it is ejected past a check valve 50 by means of a high pressure plunger 52 which is secured to the low pressure plunger 44. Excess lubricant in the low pressure cylinder 42 may be returned to the receptacle 40 past a low pressure relief valve 54.

When it is desired to relieve the pressure in the discharge conduit, the plunger is moved to its innermost position, as shown in Fig. 1, thereby moving leftward a pin 56 polygonal in cross section, which is reciprocable in a cylindrical bore 58, and thereby move a spring-pressed ball check valve 60 from its seat. Moving this valve from its seat permits comparatively free return flow of lubricant from the conduit past the check valve 54 into the receptacle 40. The details of the construction of this grease gun are disclosed in detail in Patent No. 1,869,722, granted to George F. Thomas on August 2, 1932 (Serial No. 315,635, filed October 29, 1928).

The measuring device comprises a body 62 having threaded openings 64, 66 adapted to receive the ends of conduits 28 and 26, respectively. A cup-shaped member 68 is threaded in a boss 70 formed on the body 62 and holds an annular partition plate 72 against a shoulder 74. The member 68 has a cylindrical measuring chamber 76 formed therein, the latter having an outlet port 78 to which the discharge conduit 22 is connected in any suitable manner. The outlet port 78 is adapted to be closed by a ball valve 80 which is fitted in a recess 82 formed in the lower end of a reciprocable element 84, being secured in place by having the annular projecting edge 86 of the element pressed partially around the ball. The ball valve 80 has a further function in preventing the reciprocable element 84 from moving further down than a prescribed distance, so that the piston cup 90 may be protected from crushing. The element 84 has a sidewardly projecting flange 88 which forms a backing for a cup leather piston 90, the piston being held in place by a nut 92 threaded over the lower end of the element 84. The reciprocable element 84 has an axial bore 94 formed therein, the lower end of which communicates with a port 96.

A valve and spring seat 98 is threaded in the upper end of the reciprocable element 84, having an axial passageway 100 therein, the lower end of which is normally closed by a ball valve 102 which is held against the seat by a strong compression coil spring 104. A space 109 is defined between the upper surface of the valve and spring seat and the end of the bore 108 formed in the body 62, being in communication with the conduits 28 and 26 through the vents 107 formed in the sidewardly extending flange 106, which also functions as a guide in conjunction with the cylindrical bore 108, the flange also forming the abutment or seat for the upper end of the compression spring 110. The lower end of the spring rests upon a hat washer 112 which may be made of leather or similar suitable material and forms a lubricant-tight seal between the annular partition plate 72 and the outer cylindrical surface of the reciprocable element 84.

As previously intimated, the lubricating system of my invention is adapted to be operated under extremely high pressures. Thus, the spring 110 may, for example, be made sufficiently strong so that a lubricant pressure of several hundred pounds per square inch is necessary to force the reciprocable element 84, together with its piston 90, downwardly.

Assuming that the measuring valve has been primed with lubricant, and that the bearings do not offer substantial resistance to flow of lubricant, the operation will be as follows: Upon application of the lubricant under high pressure, the reciprocable element 84 and its piston 90 will be moved downwardly until the ball valve 80 closes the discharge port 78. During this downward movement of these parts, the valve 102 will be maintained upon its seat, since it requires a lubricant pressure of a much higher order to compress its spring. Thus all of the measuring devices will operate in the manner just described, ejecting the lubricant contained in their chambers 76 through their respective discharge ports 78 to the bearings with which they are associated.

Since the pump utilized builds up this pressure gradually, all of the measuring devices will be operated so that their discharge ports 78 are closed before the pressure in the conduit system is increased sufficiently to open the check valves 102. The difference between the pressure required to force the reciprocable elements 84 to their lowermost positions and the pressure required to open the check valves 102 is so great that minor differences in the compressibility of the springs 110 of the different measuring devices will not affect the operation of the system as a whole. When, however, the lubricant pressure has become sufficiently high to open the valves 102, lubricant will flow past the valves through the ports 96 and into the partially evacuated space formed in the measuring chambers 76 above the pistons 90, thus replacing the charges which were forced to the bearings. Flow of lubricant from the chambers 76 to the bearings to be lubricated is of course prevented by the seating of the valves 80 over the outlet ports 78.

After all of the measuring devices have been operated, which the operator may determine by noting that it is impossible to force additional lubricant into the system or by having a pressure gauge connected to the discharge conduit of the pump, the operator will force the plunger 44 of the grease gun inwardly to the maximum distance, thereby forcing the pin 56 to the left and unseating the check valve 60. The pressure is thus relieved in the conduit system and the spring 110 of each of the measuring devices operates to raise its piston 90 from the lowermost to the uppermost position, during which time the measured charge above the piston is forced past the depending flanges of the cup leather 90 into that portion of the measuring chamber below the cup leather piston. The upward movement of the reciprocable element 84 causes displacement of a certain amount of lubricant in the measuring valve body, which displaced lubricant is forced through the conduits and returned to the receptacle of the grease gun.

When the bearing with which the measuring device is connected offers a high resistance to the passage of lubricant, the operation of the valve will differ slightly from that above described. Under these circumstances, the piston will not complete its downward stroke prior to the opening of the check valve, but the latter will open prior to the downward movement of the piston or at some time during its downward movement, thereby permitting lubricant to flow into the chamber 76 above the cup leather piston. Pressure of this lubricant above the piston will supplement that exerted upon the portion of the reciprocable element 90 which projects past the hat washer 112. It will thus be noted that the measuring device of my invention is capable of discharging the lubricant under higher pressures, and will do so automatically, whenever the back pressure of the bearing requires a higher discharge pressure.

It will be understood that the grease gun illustrated merely shows one type of lubricant pump which may be used with the system of my invention and that any suitable pumping means capable of developing high pressure and capable of relieving the pressure after a predetermined pressure has been attained may be used in its place. In some installations it will be desirable to utilize a power operated pump driven from a moving portion of the machine to be lubricated, or operated pneumatically or by an electric motor, while in other installations the use of a hand-operated grease gun will prove satisfactory.

While I have illustrated and described a preferred embodiment of my invention, many modifications may be made without departing from the spirit of the invention, and I do not wish to be limited to the precise details set forth but desire to avail myself of all changes within the scope of the appended claims.

I claim:

1. A lubricant measuring device comprising a cylinder having a discharge port, an element reciprocable in said cylinder and having a cup leather piston engageable with the walls thereof, said element having a portion only thereof projecting from said cylinder and exposed to pressure of lubricant from a source of supply, means forming a seal between the exposed portion of said element and the portion within said cylinder throughout the reciprocation of said element, a valve carried by said element to close said discharge port, and a lubricant by-pass from the exposed portion of said element to said cylinder behind the piston, said by-pass being normally closed by a spring-pressed valve.

2. A lubricant measuring device comprising a body having a cylindrical bore therein, a cylinder element threaded in the lower end of said bore, means to supply lubricant under pressure to said bore, a partition wall preventing flow of lubricant from said means to said cylinder, a spring pressed piston reciprocable in said cylinder element and having a reduced diameter portion projecting through said wall for sealed sliding movement relative thereto, a by-pass around said wall to said cylinder at a point behind said piston, and a spring-pressed check valve normally closing said by-pass but permitting flow of lubricant therethrough under predetermined pressure.

3. A lubricant measuring device comprising a measuring cylinder having a discharge port, a differential piston element having the larger diameter portion thereof reciprocable in said cylinder and the smaller diameter portion thereof exposed to the pressure of lubricant from a source of supply, a seal around said portion of smaller diameter to prevent leakage of lubricant around said portion of smaller diameter throughout reciprocation of the latter, a valve associated with said element to close said discharge port and thereby limit movement of said element by the force of lubricant pressure applied to the smaller of said pistons, a spring for moving said valve and said element away from said discharge port, a by-pass through said element to a point in said measuring cylinder behind the larger diameter portion of said piston, and a spring-held check valve normally closing said by-pass but openable when subjected to a predetermined pressure.

4. A lubricant measuring device comprising a measuring chamber having a movable wall extending across the same, said wall having means for permitting flow of lubricant in one direction but preventing flow in the reverse direction, lubricant pressure operated means for moving said wall to eject the contents of said chamber on one side of said wall and simultaneously form a partial vacuum on the other side of said wall, means associated with said movable wall for admitting lubricant to the partially evacuated portion of said chamber only after the wall has been moved to eject the contents of said chamber as aforesaid, said means including a resiliently held check valve, and resilient means to move said wall upon its return stroke.

5. In a lubricant measuring device, the combination of a chamber, lubricant pressure operated means partially to evacuate a portion of said chamber, means operable thereafter to supply lubricant to said portion of said chamber under predetermined lubricant pressure, and resilient means for transferring lubricant supplied to said portion of said chamber to another portion thereof upon relief of lubricant pressure.

6. In a lubricant measuring device, the combination of a body having an inlet port communicating with a bore formed in the body, a cylinder associated with said body, said cylinder having an outlet port for connection with a part to be supplied with lubricant, a piston reciprocable in said cylinder and having associated therewith a valve for closing said outlet port when the piston reaches the forward end of its stroke, sealing means separating said cylinder from said bore, a piston rod fixed relative to said piston and reciprocable through said sealing means, a compression spring held between the end of said piston stem and said sealing means, means forming a by-pass past said sealing means to a point in said cylinder behind said piston, and a loaded check valve normally closing said by-pass means.

7. In a lubricant-measuring device, a lubricant conduit, a chamber in said conduit, a cylinder adjacent said chamber, a piston in said cylinder, actuating means operably connected to said piston and extending into said chamber, resilient means for holding said piston in normal position, a check-valved by-pass forming the sole passageway for the flow of lubricant from said chamber to said cylinder behind said piston, and means for conducting lubricant from said cylinder in front of said piston to a part to be lubricated.

8. In a lubricant-measuring device, a lubricant conduit adapted to transmit lubricant under pressure, a chamber in said conduit, a cylinder with an outlet port, a piston in said cylinder with a hollow stem extending into said chamber, a valve carried by said piston for closing said port, resilient means acting upon said piston urging it into retracted position, and resistive transfer means for conducting lubricant from said chamber to said cylinder at a point behind said piston when the lubricant pressure attains a predetermined maximum value and said port is closed by said valve.

9. In a lubricant-measuring device, a chamber with an inlet and outlet, a cylinder with an outlet, an apertured sealing partition between said cylinder and said chamber, a piston in said cylinder with a stem extending into said chamber through the aperture in said partition and sealed therein, resilient means urging said piston toward said partition, a passageway in said stem to transmit lubricant from said chamber to said cylinder behind said piston, a resistive check valve in said passageway allowing flow of lubricant only under a predetermined relatively high pressure.

10. A measuring valve for centralized lubricating systems operable from a source of lubricant intermittently placed under increasing pressure, comprising a chamber normally in communication with the source of lubricant, a measuring compartment separate from said chamber and normally in communication with a part to be supplied with lubricant, said compartment having a movable wall, means operable upon a predetermined relatively low pressure for moving said wall from normal position to force the contents of said compartment to the part to be lubricated, means operable upon increased lubricant pressure to supply lubricant to the portion of said compartment vacated by said movable wall, resilient means for urging said movable wall to normal position, and means associated with said movable wall to by-pass lubricant from one side thereof to the other during the retraction of said movable wall to normal position.

11. The combination of a conduit adapted to transmit lubricant under pressure, a cylinder with an outlet, a piston in said cylinder, resilient means urging said piston to retracted position, actuating means on said piston to thrust said piston to forward position against said resilient means when lubricant pressure is at a relatively low value, and transfer means between said conduit and said cylinder adapted to be actuated when lubricant pressure is at a relatively high value to supply lubricant behind said piston, said piston having means to allow said lubricant behind said piston to flow around it upon the return stroke.

12. In a lubricant measuring device, a pressure conduit, a chamber in said conduit, a cylinder with a lubricant outlet, an apertured wall between said chamber and said cylinder, a piston in said cylinder, resilient means urging said piston to retracted position, pressure-actuated means in said chamber operably connected to said piston and having a part projecting through said aperture, said means being operable to thrust said piston against said resilient means, sealing means between said wall and said part, and lubricant transfer means between said chamber and said cylinder, said pressure-actuated means being constructed to operate at a predetermined lubricant pressure and said lubricant transfer means being constructed to operate at a relatively higher pressure to convey transferred lubricant behind said piston.

13. A measuring valve for centralized lubricating systems operable from a source of lubricant intermittently placed under increasing pressure, comprising a chamber normally in communication with the source of lubricant, a measuring compartment separate from said chamber and normally in communication with a part to be supplied with lubricant, said compartment having a movable wall, means operable upon a predetermined relatively low pressure for moving said wall from normal position to force the contents of said compartment to the part to be lubricated, means operable upon increased lubricant pressure to supply lubricant to the portion of said compartment vacated by said movable wall, resilient means for urging said movable wall to normal position, means associated with said movable wall to by-pass lubricant from one side thereof to the other during the retraction of said movable wall to normal position, and a valve operated upon movement of said wall to cut off the communication of said compartments with the part to be lubricated after the contents of said compartment have been forced to said part.

14. A device for measuring lubricant supplied to bearings, comprising a hollow body having a cylinder associated therewith, a partition separating said cylinder from the hollow portion of said body, a cup leather piston reciprocable in said cylinder and having a stem projecting through said partition, said stem having a passageway extending therethrough to by-pass lubricant past said partition to said cylinder at a point behind said piston, means to prevent passage of lubricant between said partition and said stem from said hollow body to said cylinder, and a spring pressed check valve normally closing said passageway.

15. An assembly of elements for a lubricant measuring valve comprising a piston, a headed stem for said piston, said stem having a passageway extending from the head thereof to a point adjacent said piston, a spring pressed check valve closing the head end of the passageway in said stem, a washer around said stem, a sealing element surrounding said stem adjacent said washer, and a compression coil spring having one end seated beneath the head of said stem and the other end thereof seated upon said sealing member and therethrough pressing said washer against said piston.

16. An assembly of parts for a lubricant measuring valve comprising a piston, a stem for said piston, said stem having a longitudinal passageway extending from the end thereof to a point adjacent the rear face of said piston, and a spring pressed check valve positioned in said passageway to permit flow in a direction toward said piston and to prevent flow in the reverse direction.

17. In a lubricating system, the combination of a cylinder having an outlet port in one end thereof, a piston reciprocable in said cylinder and having a valve operable to close said outlet port, a stem for said piston, means for closing the end of said cylinder opposite said outlet port and forming a seal about said stem, resilient means for moving said piston away from said outlet port, a passageway extending longitudinally through said stem to a point adjacent the rear face of said piston, a spring pressed check valve closing said passageway against flow of lubricant from the piston end to the opposite end thereof, and means for subjecting the end of said stem opposite said piston to lubricant under pressure.

ERNEST W. DAVIS.